Sept. 18, 1962   F. C. WILLIAMS   3,054,941
ELECTRICAL CONTROL ARRANGEMENTS FOR INDUCTION GENERATORS
Filed Nov. 12, 1959   3 Sheets-Sheet 1
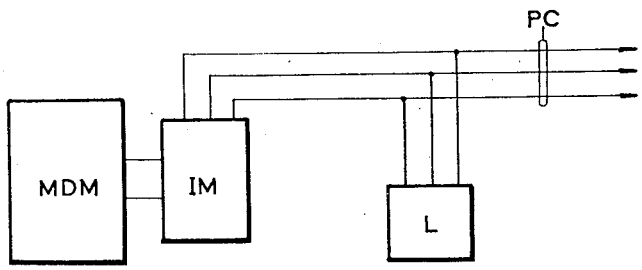
—FIG. 1.—
PRIOR ART
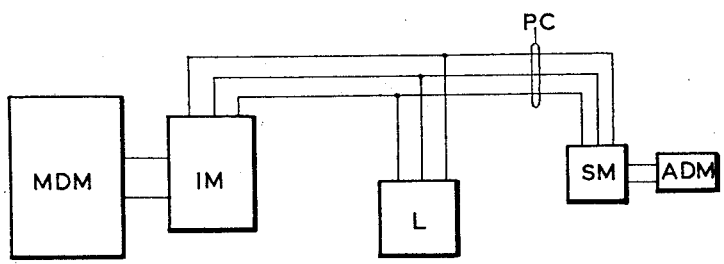
—FIG. 2.—
PRIOR ART
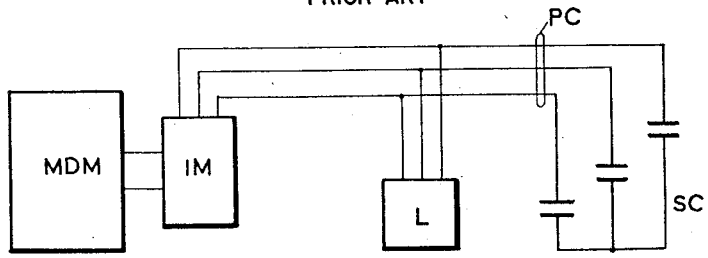
—FIG. 3.—
PRIOR ART
INVENTOR
FREDERIC CALLAND WILLIAMS
BY
Stevens, Davis, Miller & Mosher
ATTORNEYS Sept. 18, 1962            F. C. WILLIAMS            3,054,941
ELECTRICAL CONTROL ARRANGEMENTS FOR INDUCTION GENERATORS
Filed Nov. 12, 1959            3 Sheets-Sheet 2
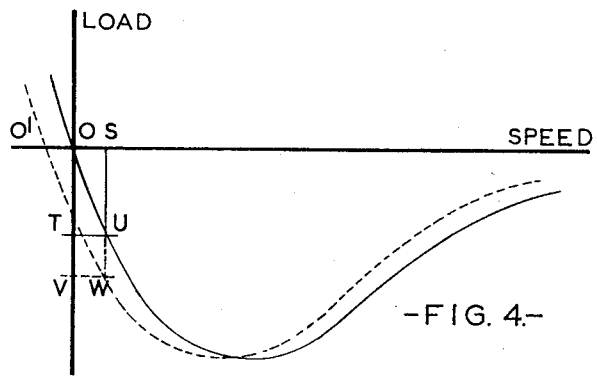
-FIG. 4.-
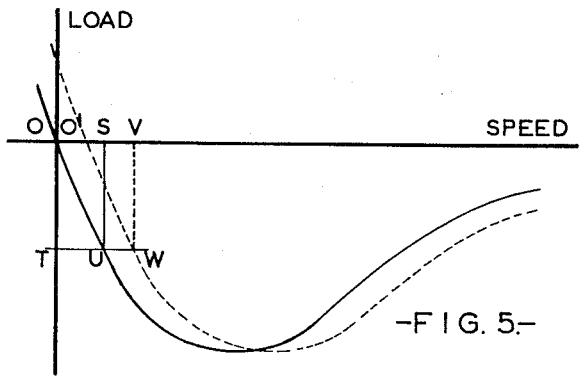
-FIG. 5.-
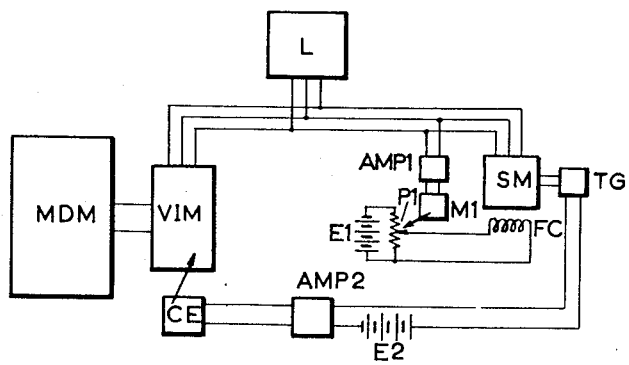
-FIG. 6.-
INVENTOR
FREDERIC CALLAND WILLIAMS
BY
Stevens, Davis, Miller & Mosher
ATTORNEYS Sept. 18, 1962　　　F. C. WILLIAMS　　　3,054,941
ELECTRICAL CONTROL ARRANGEMENTS FOR INDUCTION GENERATORS
Filed Nov. 12, 1959　　　　　　　　　　　　3 Sheets-Sheet 3
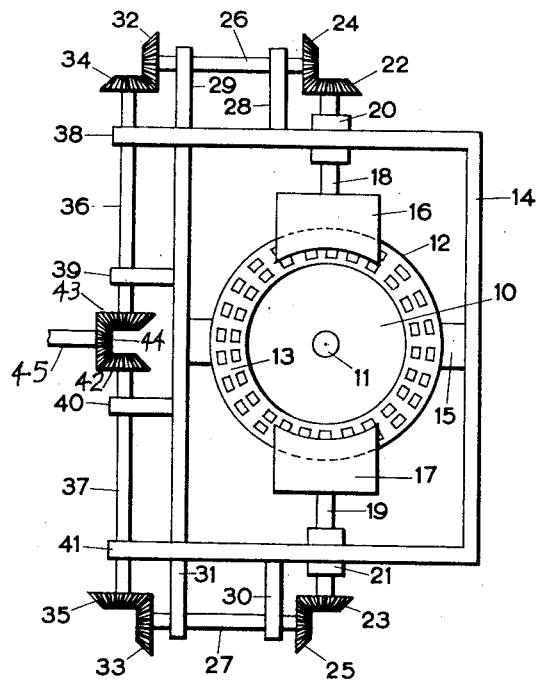
— FIG. 7. —
INVENTOR
FREDERIC CALLAND WILLIAMS
BY
Stevens, Davis, Miller + Mosher
ATTORNEYS

United States Patent Office 3,054,941
Patented Sept. 18, 1962

3,054,941
ELECTRICAL CONTROL ARRANGEMENTS FOR
INDUCTION GENERATORS
Frederic Calland Williams, Romily, England, assignor to
National Research Development Corporation, London,
England, a British corporation
Filed Nov. 12, 1959, Ser. No. 852,543
Claims priority, application Great Britain Nov. 14, 1958
6 Claims. (Cl. 322—47)

The present invention relates to induction generators.

The use of an induction motor or machine as an induction generator is well known and the method usually employed is to drive the rotor of the induction machine at a speed above synchronous speed when current will be supplied to a load from the stator winding. Although an induction machine connected to a source of alternating voltage can supply power when driven above its normal synchronous speed, it cannot supply reactive volt-amps. and more particularly it cannot supply its own magnetising current or leakage reactance voltage drop. Such quadrature currents must be supplied from the A.C. source. Known induction generators are of three types which may be described as follows:

(1) Those in which the stator of the induction machine is connected to infinite A.C. busbars. By "infinite busbars" it is to be understood that the source of A.C. is of zero impedance and that the voltage and frequency therefrom are fixed no matter what the current flow.

(2) Those in which the induction machine has its reactive volt-amps. supplied from a small alternator which is driven by a small motor.

(3) Those in which the induction machine has its reactive volt-amps. supplied from a static condenser.

Reference will now be made to the accompanying drawings comprising FIGS. 1 to 7 in which FIGS. 1 to 3 respectively illustrate diagrammatically the three known types of induction generators, FIGS. 4 and 5 show load characteristics for explaining the operation of the induction generator of the present invention, FIG. 6 shows diagrammatically the induction generator of the present invention and FIG. 7 shows the control device for adjusting the synchronous speed of the induction generator of the present invention.

Referring first to FIGS. 1 to 3, the induction machine is indicated at IM, the main drive motor which drives the rotor of the induction machine is indicated at MDM and the load is indicated at L. In FIG. 1, which represents the first type of induction generator, the three phase conductors PC are connected to infinite A.C. busbars i.e. an infinitely large power source or sink. In FIG. 2, which represents the second type of induction generator, the three phase conductors PC are connected to the small alternator or synchronous machine SM which is driven by the small auxiliary motor ADM. Finally in FIG. 3, which represents the third type of induction generator, the three phase conductors PC are connected to the static condenser SC.

As regards the induction generators of the first type, their operation may be summarised by saying that the induction machine absorbs electrical power $p_m$ from the busbars if its speed falls below the synchronous speed, and it then behaves as a motor, supplying mechanical power to the main drive motor MDM, the quantity of this power being determined by the relative value of $v$ and $v_s$ where $v$ is the speed of the main drive motor and $v_s$ is the synchronous speed of the induction machine. When $v$ is greater than $v_s$, the induction machine absorbs mechanical power from the main drive and delivers electrical power $p_m$, the value of $p_m$ again being determined by the relative values of $v$ and $v_s$. The induction machine absorbs reactive volt-amps. at all values of $v$, but the magnitude of this quantity depends on the relative values of $v$ and $v_s$ and is a minimum when $v \approx v_s$. The action of the induction machine is completely unaffected by the magnitude and composition of the load.

In the second type of induction generator, if the synchronous machine is unable to supply the deficit or absorb the surplus of power demanded by the combination of load and induction machine, the frequency generated will decrease or increase respectively because when power is drawn from the synchronous machine, the regulation of the auxiliary driving motor causes the synchronous machine to slow down and the frequency is lowered. The reverse action takes place if power is absorbed by the synchronous machine. If the synchronous machine is unable to supply the deficit of reactive volt-amps. demanded by the combination of load and induction machine, the voltage output of the synchronous machine will fall because when current is withdrawn from the machine, its internal impedance produces a voltage drop at its output terminals. Generation will then cease. An excess of reactive volt-amps. causes the synchronous machine to become more saturated. In this form of system, therefore, voltage and frequency are dependent on both demanded load and main drive speed.

The excitation of the synchronous machine will also effect both speed and voltage since variation of excitation varies the reactive volt-amps. which the synchronous machine can deliver.

Once the induction generator of the second type has been started, the auxiliary drive motor may be removed. The synchronous machine now runs as a motor by consuming power supplied by the induction machine, at the same time as it supplies the reactive volt-amps. required by the induction machine. The voltage and frequency are now entirely under the control of the synchronous machine excitation. A demand for too high a value of reactive volt-amps. from the load for a given excitation value will result in collapse of the induction machine excitation, cessation of generator action and stopping of the synchronous machine.

The operation of induction generators of the third type is even more critical. The condensers constitute a fixed reactance, unlike the synchronous machine of the second type whose reactive component can be varied by varying the excitation. The induction machine voltage is limited by the shape of the B-H characteristic of the iron in the same way as that of a D.C. shunt generator. Changes of load power effect both voltage and frequency generated and changes in reactive volt-amps. in the load are very likely to result in collapse of the system.

The inflexibility of the conventional induction machine in that its impedance is set by the relative values of $v$ and $v_s$ and little else, makes it unsuitable for use as a generator which is required to deliver a constant voltage and frequency for a wide range of main drive speeds into a load which is not connected to an infinite busbar system.

The main object of the present invention is to provide an induction generator which is not subject to these limitations while a further object of the invention is to provide control equipment which enables the voltage and frequency of the generated alternating current to be controlled.

According to the present invention an induction generator includes a main drive motor arranged to drive the rotor of an induction machine whose synchronous speed is adjustable over a range of values, an independent synchronous machine for supplying magnetising current to said induction machine and means for automatically adjusting the synchronous speed of said induction machine in such a manner as to maintain constant the frequency of the output of said induction machine.

Variable speed induction machines are known which effectively operate by varying the synchronous speed where the synchronous speed is regarded as the speed of movement of the moving magnetic field set up by the stator winding along the direction of movement of the rotor. An example of an induction machine of this character is shown in United States Patent No. 2,856,573. The machine described in this specification operates by effectively changing the stator pole pitch in the direction of rotation of the rotor.

The advantage obtained by using a variable speed induction machine of this type will be understood from a consideration of FIGS. 4 and 5 of the accompanying drawings which show that part of the speed/load curves which are operative when the machine is acting as a generator. Referring first to FIG. 4, the full line curve is that on which the induction machine is operating to supply a load indicated by OT. If now there is a sudden increase from OT to OV in the load demanded, the speed of the motor driving the rotor remaining constant, control arrangements become effective to alter the synchronous speed of the machine so that it now operates on the dotted curve which passes through the point W, this point being the intersection of the speed ordinate SU with the new demanded load VW. The synchronous speed of the machine will thus have been reduced from O to O'. In FIG. 5, it is assumed that the load remains constant at the value OT and that the speed of the motor driving the rotor of the induction machine changes from OS to OV. The control arrangements will now become effective to alter the synchronous speed of the machine so that it operates on the dotted curve which passes through the point W, this point being the intersection of the load ordinate TU with the new speed VW. The synchronous speed of the machine has in this case been increased from O to O'.

The arrangements for varying the synchronous speed of the induction machine are controlled in accordance with the speed of the synchronous machine. According, therefore, to a feature of the invention, an induction generator includes a main drive motor arranged to drive the rotor of an induction machine whose synchronous speed is adjustable over a range of values, an independent synchronous machine for supplying magnetising current to said induction machine and means controlled in accordance with the speed of said synchronous machine for varying the synchronous speed of said induction machine.

From what has been said previously, it will be understood that if the speed of the motor driving the rotor of the induction machine varies, power will be fed to or withdrawn from the synchronous machine leading to an increase or a decrease respectively in the speed of the synchronous machine. Means, for instance including a tachometer generator, are therefore provided for obtaining a voltage representing the change in speed of the synchronous machine from a predetermined value and this voltage is used to operate the control equipment of the induction machine. Such control equipment may be mechanical or electrical depending on the type of induction machine employed.

There may be circumstances where the time constant of the control arrangements is too long to follow a rapid fluctuation in, for instance, the speed of the motor driving the rotor of the induction machine. Such circumstances may arise where the induction generator is operated to supply the power requirements in an aircraft and the drive to the rotor of the induction machine is derived from the aircraft engine. In order to avoid any sharp drop in the power supplied by the generator due to this cause it is arranged that the synchronous machine has considerable inertia and is thus capable of supplying power to the load during such transient conditions.

The output voltage of the induction machine may be subject to variation due, for instance, to changes in the internal reactance of the induction machine. According to another feature of the invention the output voltage is maintained constant by varying the excitation of the synchronous machine in accordance with changes in the output voltage. This is possible because the back E.M.F. of a synchronous motor is proportional to the field current and the terminal voltage of the synchronous machine will not be very different from the back E.M.F. because, due to the presence of first control previously mentioned, the synchronous machine does not absorb or deliver a large power. Preferably, the voltage is measured between two phases of the output or between one phase and neutral and, after amplification, is employed to vary the energising current in the field coil of the synchronous machine. The field coil is normally energised from a D.C. source and in one embodiment, the output of the amplifier energises a motor which mechanically controls the position of the slider of a potentiometer connected across the D.C. source. This control may, however, be exerted in other ways.

It will thus be seen that the induction generator according to the invention comprises a variable synchronous speed induction machine the rotor of which is driven from a suitable motor while the magnetising current is supplied by an independent synchronous machine. The generator incorporates two control circuits of which the first controls the synchronous speed of the induction machine in accordance with changes of speed of the synchronous machine while the second controls the excitation of the synchronous machine in accordance with changes in output voltage delivered by the induction machine.

A diagrammatic representation of the induction generator according to the invention is shown in FIG. 6 of the accompanying drawings in which the variable speed induction machine VIM having its rotor driven by the motor MDM supplies power to the load L. The synchronous machine SM supplies the magnetising current to the stator winding of the induction machine and the reactive volt-amps. of the load. The first control circuit comprises the tachometer generator TG driven by the synchronous machine, the output circuit of the tachometer generator TG including a D.C. source of reference voltage E2 and the amplifier AMP2. The output from the amplifier is fed to the control equipment CE of the induction machine. The second control circuit comprises the amplifier AMP1 connected between two of the phases, the output of the amplifier energising the motor M1 which mechanically controls the slider of the potentiometer P1. This potentiometer is connected across the D.C. source E1 which energises the field coil FC of the synchronous machine. It will, of course, be understood that the generator is started by first starting the synchronous machine, for instance, by mechanical means whereupon, provided the motor is driving the rotor, the induction machine will start automatically.

The control equipment CE for varying the synchronous speed of the induction machine is shown in greater detail in FIG. 7. Referring to this drawing, the induction machine, which is of the type described in United States Patent No. 2,856,573, consists of a rotor 10 mounted on a shaft 11. The rotor is formed of iron laminations and has a spherical surface 12 in which is embedded a mesh 13 of conducting material. The rotor shaft is carried in bearings provided in cross members in a frame 14, one only of the cross members 15 being shown. The stator consists of two blocks 16 and 17 mounted on shafts 18 and 19 which pass through and are rotatable within bearings 20 and 21 in the frame 14. The stator blocks are slotted to receive the three phase windings but these are not shown in the drawings. Bevel gears 22 and 23 are secured to the shafts 18 and 19 respectively and engage with bevel gears 24 and 25 on shafts 26 and 27 mounted in bearings provided in brackets 28, 29 and 30, 31 secured to the frame 14. The opposite ends of the shafts 26 and 27 are also provided with bevel gears 32, 33 which engage with bevel gears 34, 35 mounted on two shafts 36, 37 mounted in axial alignment in bearings formed in brackets 38, 39 and 40, 41 secured to the frame. The other ends of the shafts 36 and 37 are also provided with bevel gears 42, 43 which engage with the single bevel gear 44 mounted on the shaft 45 which is driven by the reversible motor CE the energising current for which is provided by the amplifier AMP2 (FIG. 6). It will be understood that with the gearing between the shaft 45 and the stator blocks as shown, rotation of the shaft 45 rotates the stator blocks in opposite directions as required and further that rotation of the shaft 45 in one direction will lead to an increase in the synchronous speed of the induction machine while rotation in the opposite direction will lead to a decrease in synchronous speed.

I claim:

1. An induction generator including an induction machine whose synchronous speed is adjustable over a range of values, a main drive motor arranged to drive the rotor of said induction machine, an independent synchronous machine for supplying magnetising current to said induction machine and means for automatically adjusting the synchronous speed of said induction machine in such a manner as to maintain constant the frequency of the output of said induction machine.

2. An induction generator including an induction machine whose synchronous speed is adjustable over a range of values, a main drive motor arranged to drive the rotor of said induction machine, an independent synchronous machine for supplying magnetising current to said induction machine and means controlled in accordance with the speed of said synchronous machine for varying the synchronous speed of said induction machine.

3. An induction generator including an induction machine, means for adjusting the synchronous speed of said induction machine over a range of values, a main drive motor arranged to drive the rotor of said induction machine, an independent synchronous machine for supplying magnetising current to said induction machine, means for driving a voltage proportional to the speed of said synchronous machine and a control device which responds to changes in said derived voltage and which acts on said adjusting means to adjust the speed of said induction machine in accordance with said changes.

4. An induction generator including an induction machine, means for adjusting the synchronous speed of said induction machine over a range of values, a main drive motor arranged to drive the rotor of said induction machine, an independent synchronous machine for supplying magnetising current to said induction machine, means for driving a voltage proportional to the speed of said synchronous machine and a control device which responds to changes in said derived voltage and which acts on said adjusting means to adjust the speed of said induction machine in accordance with said changes.

5. An induction generator including an induction machine, means for adjusting the synchronous speed of said induction machine over a range of values, a main drive motor arranged to drive the rotor of said induction machine, an independent synchronous machine for supplying magnetising current to said induction machine, means for automatically controlling said adjusting means to adjust the synchronous speed of said induction machine thereby to maintain constant the frequency of the output of said induction machine and means controlled in accordance with changes in the output voltage delivered by said induction machine for varying the excitation of said synchronous machine.

6. An induction generator including an induction machine, means for adjusting the synchronous speed of said induction machine over a range of values, a main drive motor arranged to drive the rotor of said induction machine, an independent synchronous machine for supplying magnetising current to said induction machine, means controlled in accordance with the speed of said synchronous machine for acting on said adjusting means to adjust the synchronous speed of said induction machine and means controlled in accordance with changes in the output voltage delivered by said induction machine for varying the excitation of said synchronous machine.

References Cited in the file of this patent

UNITED STATES PATENTS 2,887,645    Polasek _____ May 19, 1959